United States Patent [19]

Morini et al.

[11] 4,039,292
[45] Aug. 2, 1977

[54] CATALYTIC CONVERTER FOR OVEN FUMES

[75] Inventors: Ralph E. Morini; Martin D. Turgeon, both of Southington, Conn.

[73] Assignee: The Stanley Works, New Britain, Conn.

[21] Appl. No.: 670,675

[22] Filed: Mar. 26, 1976

[51] Int. Cl.² .......................... B01J 1/00; B01J 35/04; F24C 1/00; F01N 3/15

[52] U.S. Cl. .............................. 23/288 FC; 126/19 R; 219/393

[58] Field of Search ........ 23/288 F, 288 FA, 288 FB, 23/288 FC; 219/393, 397; 126/19 R; 55/387, 504, 509

[56] References Cited

U.S. PATENT DOCUMENTS

| | | | |
|---|---|---|---|
| 2,068,048 | 1/1937 | Adams | 55/509 X |
| 3,018,841 | 1/1962 | Gerlich | 23/288 F |
| 3,170,872 | 2/1965 | Balogh et al. | 55/387 X |
| 3,364,912 | 1/1968 | Dills et al. | 126/21 A |
| 3,428,434 | 2/1969 | Hurko | 219/393 UX |
| 3,441,382 | 4/1969 | Keith et al. | 23/288 FC |
| 3,785,778 | 1/1974 | Burstein et al. | 219/393 X |
| 3,838,977 | 10/1974 | Warren | 23/288 F |
| 3,945,803 | 3/1976 | Musall et al. | 23/288 FC |
| 3,948,611 | 4/1976 | Stawsky | 23/288 FC |

Primary Examiner—Morris O. Wolk
Assistant Examiner—Roger F. Phillips

[57] ABSTRACT

A catalytic oxidation unit of the type used for oxidizing fumes from ovens and the like comprises a metallic housing providing a tubular body portion with spaced shoulders in the through passage and a block of cellular ceramic material therebetween. One of the spaced shoulders is provided by an apertured front wall on the housing, and the block of ceramic material is biased against this front wall shoulder by resiliently compressible means acting between the block and the other shoulder. The ceramic material block has an oxidation catalyst on the walls of the cells thereof which is effective to oxidize organic materials in the fumes passing through the metallic housing and the block of ceramic material therewithin.

6 Claims, 3 Drawing Figures

CATALYTIC CONVERTER FOR OVEN FUMES

BACKGROUND OF THE INVENTION

With the advent of self-cleaning ovens there has been an even greater need for treatment of the carbonaceous components of the fumes passing from the oven. Various oxidation units have been developed and used quite successfully as a component of self-cleaning ovens to effect conversion of the hydrocarbon products. Exemplary of the various types of structures and prior art efforts are those disclosed and claimed in the following U.S. Letters Patent: Scofield U.S. Pat. No. 2,862,095 granted Nov. 25, 1958; Hurko U.S. Pat. No. 3,121,158 granted Feb. 11, 1964; Hurko Pat. No. 3,290,483 granted Dec. 6, 1966; Dills et al. U.S. Pat. No. 3,364,912 granted Jan. 23, 1968; Faehling et al. U.S. Pat. No. 3,549,859 granted Dec. 22, 1970; Brucken U.S. Pat. No. 3,782,360 granted Jan. 1, 1974; and Burstein U.S. Pat. No. 3,785,778 granted Jan. 15, 1974.

Various types of catalytic materials have been proposed for use in such converters, some being spiral wound wires or filaments, some being catalyst beads, some being catalyst-coated refractory materials, and some being a coated screen. A common problem encountered in such converters is that of differential expansion of the catalyst component relative to its surrounding housing, and that has been particularly acute when refractory materials have been employed. When the metal housing expands substantially, the ceramic block tends to be free to move excessively within the housing and is particularly susceptible to injury due to impacts or shocks while in this relatively unrestrained condition.

It is an object of the present invention to provide a catalytic oxidation unit for ovens and the like utilizing a block of cellular ceramic material with a catalyst coating which is firmly supported within a metallic housing over the entire range of operating temperatures.

It is also an object to provide such a catalytic oxidation unit which may be fabricated readily and relatively economically and which is simple to install in an oven or like unit.

Another object is to provide such a catalytic oxidation unit employing a relatively fragile honeycomb ceramic block having a surface coating of oxidation catalyst on the walls of the cells thereof.

SUMMARY OF THE INVENTION

It has now been found that the foregoing and related objects can be readily obtained in a catalytic oxidation unit for use with ovens and the like comprising a metallic housing including a tubular body portion, a front wall extending across one end of the body portion and having an aperture therein smaller than the cross section of the body portion to provide a first peripheral shoulder. The housing also has a conduit portion of lesser cross section than the cross section of the body portion and spaced from the opposite end thereof, and a shoulder portion extending between the opposite end of the body portion and the conduit portion to provide a second peripheral shoulder spaced from the first peripheral shoulder. A block of cellular ceramic material having an oxidation catalyst on the walls of the cells thereof is seated within the body portion of the housing, and resiliently compressible means acts between the block and the second shoulder to bias the block against the first shoulder.

In the preferred embodiment, the block of ceramic material is of honeycomb construction and the ceramic material is alumina. The housing is of generally circular cross section and the block of ceramic material is of generally cylindrical configuration. The aperture in the front wall of the housing is of circular configuration and is of a diameter 10–35 percent less than the diameter of the body portion.

Most desirably the housing is of two-piece construction with an outwardly extending peripheral flange integrally formed with the body portion at the one end thereof and a cover member secured to the flange and providing the front wall. This cover member is of greater width than the flange, and its portion extending outwardly of the flange is adapted for mounting upon a support surface within a stove or the like. The resiliently compressible means comprises a helical spring, and the housing is of circular cross section and the shoulder portion is of frustoconical configuration.

DESCRIPTION OF THE PREFERRED EMBODIMENTS

Figure 1:
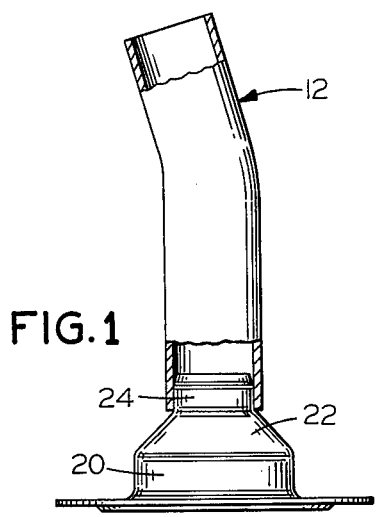
FIG. 1 is a side elevational view of a catalytic oxidation unit constructed in accordance with the present invention coupled with a vent tube having portions thereof broken away for clarity of illustration.

Turning now in detail to the attached drawing, a catalytic oxidation unit embodying the present invention has a tubular housing generally designated by the numeral 10 and is coupled with a vent tube generally designated by the numeral 12 through which fumes will pass for eventual discharge to the atmosphere. Seated within the housing 10 is a ceramic block generally designated by the numeral 14 which is biased against the cover plate generally designated by the numeral 16 through the action of the spring 18.

The housing 10 is of tubular metallic construction and includes a cylindrical body portion 20 and a frustoconical shoulder portion 22 extending from one axial end thereof to the cylindrical conduit portion 24 which is of lesser diameter than the body portion 20. Extending outwardly from the other axial end of the body portion 20 is an annular peripheral flange 26 which seats within an annular recess 32 provided by the inner portion 28 of the cover plate 16.

Figure 2:
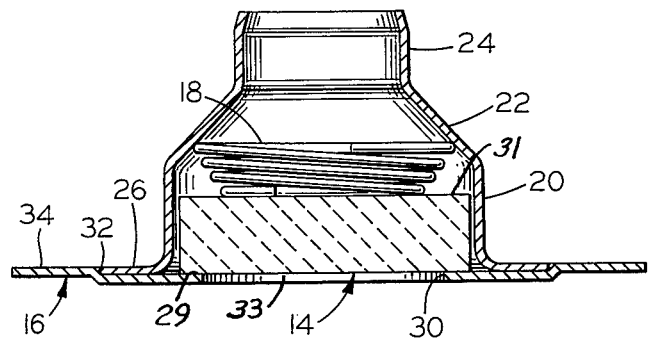
FIG. 2 is a cross sectional view of the catalytic oxidation unit of FIG. 1 drawn to an enlarged scale.
Figure 3:
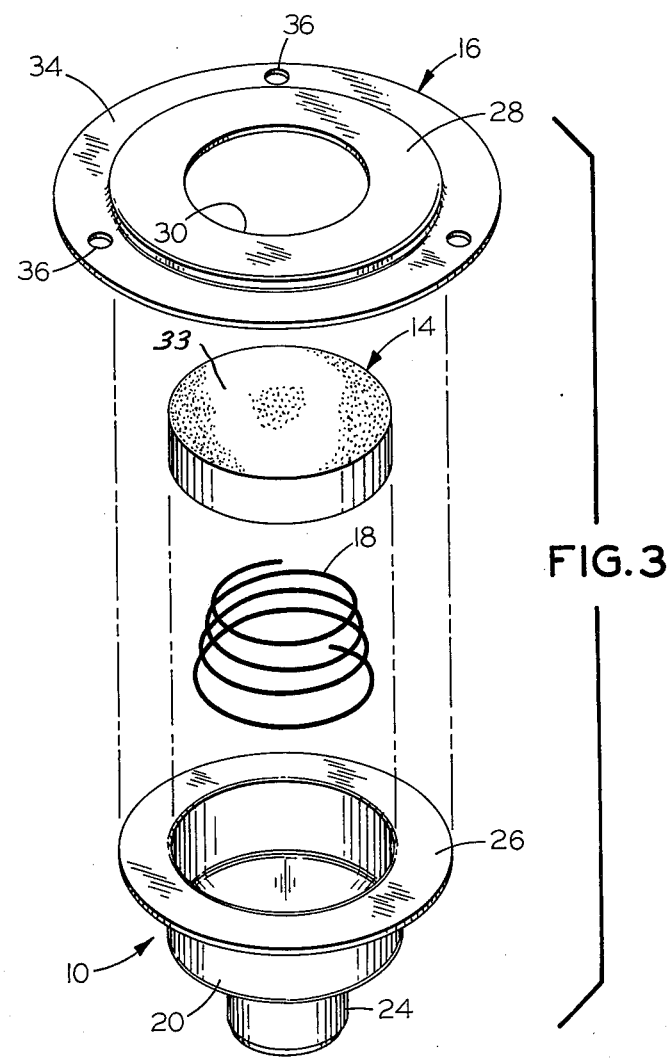
FIG. 3 is an exploded view of the catalytic oxidation unit drawn to the scale of FIG. 2.

As best seen in FIGS. 2 and 3, the inner portion 28 has an aperture 30 of smaller diameter than the diameter of the tubular body portion 20 so as to provide an annular shoulder 29 at one end of the tubular body portion 20. The annular outer portion or collar 34 of the cover plate 16 thus extends outwardly of the periphery of the housing 10 and is provided with a plurality of spaced apertures 36 for mounting the catalytic oxidation unit in position upon a wall of an oven or the like with which the unit is used.

The ceramic block 14 is of honeycomb construction providing a multiplicity of small cells, and the ceramic material providing the walls of the cells has a coating of oxidation catalyst thereon effective at the temperatures of operation to oxidize the hydrocarbons present in the fumes into carbon dioxide. As seen, the helical spring 18 has a relatively wide diameter portion bearing upon the frustoconical shoulder portion of the housing 10 and a relatively narrow diameter portion bearing upon the inner surface 31 of the ceramic block 14 so that inner surface 31 is spaced from frustoconical shoulder portion 22. Outer surface 33 of block 14 is disposed opposite inner surface 31 and is seated on annular shoulder 29 and biased against it by spring 18 so that block 14 covers aperture 30.

In operation of the unit, fumes from the oven enter the housing 10 through the aperture 30 in the cover plate 16 and must pass through the cells of the ceramic block 14 wherein they are in intimate contact with the catalyst distributed thereabout. Following passage through the ceramic block 14, the fumes funnel into the conduit portion 24 and thence into the vent tube 12 for eventual discharge to the atmosphere. At the elevated conditions of operations, the housing 10 tends to expand considerably more than the ceramic block 14, but the spring 18 exerts sufficient biasing pressure upon the ceramic block 14 to hold it tightly against the cover plate 16 and thus prevent undesired shifting within the tubular housing 10 and possible damage to the ceramic block 14.

In the illustrated embodiment the housing has been shown as being fabricated from two metallic elements which may be readily formed. It will be appreciated that the housing may be constructed from three or more elements if so desired. The configuration may vary from the circular cross section of the illustrated embodiment; however, a circular cross section affords the advantage of providing uniform expansion in all directions in the transverse plane.

The face plate of the housing may be secured to the body of the housing by any convenient means includig rivets, welding, screw fasteners or the like. If so desired, the outer peripheral portion of the face plate may be omitted and the same fasteners employed to secure the face plate to the body of the housing may be used to secure the entire assembly to the wall of the oven or the like.

Although various types of catalyst-coated porous ceramic blocks may be employed in the assembly of the present invention, a honeycomb alumina refractory block coated with a platinum/palladium oxidation catalyst has proven particularly advantageous. The honeycomb structure provides a high strength ceramic unit affording facile passage of the fumes therethrough in intimate contact with the walls of the cells defining the honeycomb. A highly satisfactory catalyst ceramic block is one manufactured by Oxy Catalyst, a division of Research Cottrell.

It will be appreciated that the spring used to bias the ceramic block tightly against the front face of the housing may have a variety of configurations depending upon the configuration of the housing itself. In practice, a helical compression spring of the type illustrated with a frustoconical configuration has been found particularly advantageous to minimize shifting and to effect desired centering action. The spring should be fabricated using heat treatment procedures which will maintain the desired spring action over extended periods of time at the elevated temperatures of operation to which the assembly is exposed.

Illustrative of a specific unit embodying the present invention is a unit fabricated in accordance with the illustration of the attached drawing. The body of the housing is fabricated from deep-drawn steel having a wall thickness of 0.036 inch with the body portion having an internal diameter of about 2.0 inches and a peripheral flange of 3.0 inches. The conduit portion has an outer diameter of 1.17 inches and the conical shoulder portion extends between the body portion and the conduit portion at an angle of about 45° to provide a length from the bottom of the peripheral flange to the conduit portion of about 1 ⅛ inches. The length of the conduit portion is about ½ inch. and the peripheral flange is provided with three small apertures at a spacing of 120° for rivets to secure the body portion of the housing to the cover plate. The cover plate is provided with the offset inner portion as illustrated and has a central aperture of 1 ⅜ inches diameter. The outer diameter of the cover plate is 4.25 inches and the outer portion is provided with three apertures at 120° angular spacing.

The ceramic block has a diameter of 2.00 inches and a thickness of 0.50 inch. The spring has a maximum outside diameter of 2.00 inches and a free length of 1 ⅛ inches with a minimum diameter of 1 ¼ inches.

From the foregoing detailed specification and drawing, it can be seen that the catalytic oxidation unit of the present invention is highly advantageous and employs a block of cellular ceramic material having a catalytic coating thereon firmly supported within a metallic housing over the entire range of operating temperatures. The oxidation unit may be fabricated readily and relatively economically from the several component parts and is simple to assemble and to install in an oven or the like unit. With this unit, the relatively fragile ceramic block is afforded secure protection against injury resulting from impacts which might occur during shipment of the stove or during operation of the stove.

Having thus described the invention, we claim:

1. A catalytic oxidatin unit for use with ovens and the like comprising:
   a. a metallic housing including a tubular body portion, a front wall extending across one end of said body portion and having an aperture therein smaller than the cross section of said body portion to provide a first peripheral shoulder, a conduit portion of lesser cross sectional area than the cross section of said body portion and spaced from the opposite end thereof, and a shoulder portion extending between said opposite end of said body portion and said conduit portion to provide a second peripheral shoulder spaced from said first peripheral shoulder;
   b. a block of cellular ceramic material having an oxidation catalyst on the walls of the cells thereof seated within said body portion of said housing, said block having oppositely disposed inner and outer surfaces extending transversely of said body portion of said housing, said outer surface being larger than said aperture in said front wall and seated against said first peripheral shoulder and said inner surface being spaced from said second peripheral shoulder; and
   c. resiliently compressible means having one end disposed against said inner surface of said block and the other end disposed against said second shoulder to bias said outer surface of said block against said first shoulder to cover said aperture with said block and maintain said block in firm contact with said first shoulder during impacts and thermal expansion and contraction, said compressible means being pervious to passage of gases therethrough, whereby gases entering the unit through the exposed portion of said outer surface of said block may exit through substantially the entire transverse dimension of said inner surface of said block.

2. the catalytic oxidation unit of claim 1 wherein said housing is of generally circular cross section and wherein said block of ceramic material is of generally cylindrical configuration and of honeycomb construction, said ceramic material being alumina; and wherein said aperture in said front wall of said housing is of circular configuration and is of a diameter 10-35 percent less than the diameter of said body portion.

3. the catalytic oxidation unit of claim 1 wherein said housing is of two-piece construction with an outwardly extending peripheral flange integrally formed with said body portion at said one end thereof and a cover member secured to said flange and providing said front wall, said cover member being of greater width than said flange with the portion extending outwardly of said flange being adapted for mounting upon a support surface within a stove or the like.

4. The catalytic oxidation unit of claim 1 wherein sid resiliently compressible means comprises a helical spring of frustoconical configuration.

5. The catalytic oxidation unit of claim 1 wherein said housing is of circular cross section and said shoulder portion is of frustoconical configuration, wherein said block of ceramic material is of generally cylindrical configuration and is of honeycomb construction, and wherein said compressible means comprises a helical spring of frustoconical configuration.

6. the catalytic oxidation unit of claim 5 wherein said housing is of two-piece construction with an outwardly extending peripheral flange integrally formed with said body portion at said one end thereof and a cover member secured to said flange and providing said front wall, said cover memeber being of greater width than said flange with the portion extending outwardly of said flange being adapted for mounting upon a support surface within a stove or the like.

* * * * *